United States Patent [19]

Nakano

[11] Patent Number: 5,178,043
[45] Date of Patent: Jan. 12, 1993

[54] CONTROL VALVE ASSEMBLY OF TRACTION DRIVE TRANSMISSION

[75] Inventor: Masaki Nakano, Kawasaki, Japan

[73] Assignee: Nissan Motor Co., Ltd., Yokohama, Japan

[21] Appl. No.: 732,202

[22] Filed: Jul. 19, 1991

[30] Foreign Application Priority Data

Jul. 19, 1990 [JP] Japan .................................. 2-191544

[51] Int. Cl.$^5$ .............................................. F16H 59/02
[52] U.S. Cl. ........................................ 74/866; 475/132
[58] Field of Search .................... 74/866; 475/116, 132

[56] References Cited

U.S. PATENT DOCUMENTS

| | | | |
|---|---|---|---|
| 4,519,273 | 5/1985 | Shimizu et al. | 475/132 X |
| 4,533,340 | 8/1985 | Abo et al. | 475/18 X |
| 4,616,530 | 10/1986 | Tanaka et al. | 74/860 X |
| 4,735,113 | 4/1988 | Yamamuro et al. | 74/867 X |
| 4,736,655 | 4/1988 | Kumura et al. | 74/866 |
| 4,916,982 | 4/1990 | Suzuki | 74/867 X |
| 4,939,958 | 7/1990 | Hayasaki | 74/867 |

FOREIGN PATENT DOCUMENTS

0373649 6/1990 European Pat. Off. .
0373650 6/1990 European Pat. Off. .

*Primary Examiner*—Dirk Wright
*Attorney, Agent, or Firm*—Foley & Lardner

[57] ABSTRACT

A traction drive transmission includes a forward reverse change-over mechanism followed by a half-toroidal dual-cavity traction drive system. A control valve assembly includes a valve body. The valve body has on its periphery a mount site and formed with a first valve bore adjacent the mount site and a second valve bore. A rotary actuator in the form of a stepper motor is secured to the mount site. A forward shift control valve has a valve element and a rod slidably disposed in the first valve bore, while a reverse ratio valve has a valve element slidably disposed in the second valve bore. The rod is provided with a rack and the stepper motor has a pinion meshing the rack. A first lever associated with a first precess cam is mounted on the valve body to cooperate with the valve element of the forward shift control valve. A second lever associated with a second precess cam is mounted on the valve body to cooperate with the valve element of the reverse ratio valve.

5 Claims, 6 Drawing Sheets

CONTROL VALVE ASSEMBLY OF TRACTION DRIVE TRANSMISSION

BACKGROUND OF THE PRESENT INVENTION

The present invention relates to a control system for a traction drive transmission including a forward reverse change-over mechanism followed by a traction drive system.

Copending U.S. patent application Ser. No. 07/448,194 now U.S. Pat. No. 5,052,236 and the corresponding European Patent Application No. 89 123 150.8 disclose a traction drive transmission including a change-over mechanism followed by a half-toroidal dual-cavity drive system. This transmission includes hydraulic actuators or servo motors for continuously varying a reduction ratio by varying the angle of inclination of friction or power rollers. A hydraulic control system for the servo motors comprises a forward shift control valve operatively connected to a forward stepper motor, a reverse shift control valve operatively connected to a reverse stepper motor, and a forward reverse change-over valve operatively associated with a collar of a forward/reverse rotational direction detecting mechanism coupled with a counter shaft of the traction drive system. In the forward running, the forward reverse change-over valve assumes a forward position wherein the servo motors are fluidly connected to the forward shift control valve, while, in the reverse running, the forward reverse change-over valve assumes a reverse position wherein the servo motors are fluidly connected to the reverse shift control valve. Each of the shift control valves is drivingly connected to the associated stepper motor via a drive mechanism employing a feed screw. Since the feed screw is used in the drive mechanism, each of the stepper motors is required to produce a relatively large torque, a stepper motor of relatively large type is needed. Besides, two such stepper motors are needed. Thus, it is difficult to reduce the size of the control valve assembly.

An object of the present invention is to improve a hydraulic control system for a traction drive system including a forward reverse change-over mechanism followed by a traction drive system such that the size of the control valve assembly is reduced considerably.

SUMMARY OF THE INVENTION

According to the present invention, there is provided a control valve assembly for a traction drive transmission having a forward reverse change-over mechanism followed by a traction drive system, comprising:

a valve body having on its periphery a mount site;

a rotary actuator secured to the mount site;

the valve body being formed with a first valve bore adjacent the mount site, and a second valve bore;

a forward shift control valve including a valve element slidably disposed in the first valve bore, the forward shift control valve being drivingly connected to said rotary actuator; and a revese ratio valve including a valve element slidably disposed in the second valve bore.

DETAILED DESCRIPTION OF THE INVENTION

Figure 2:
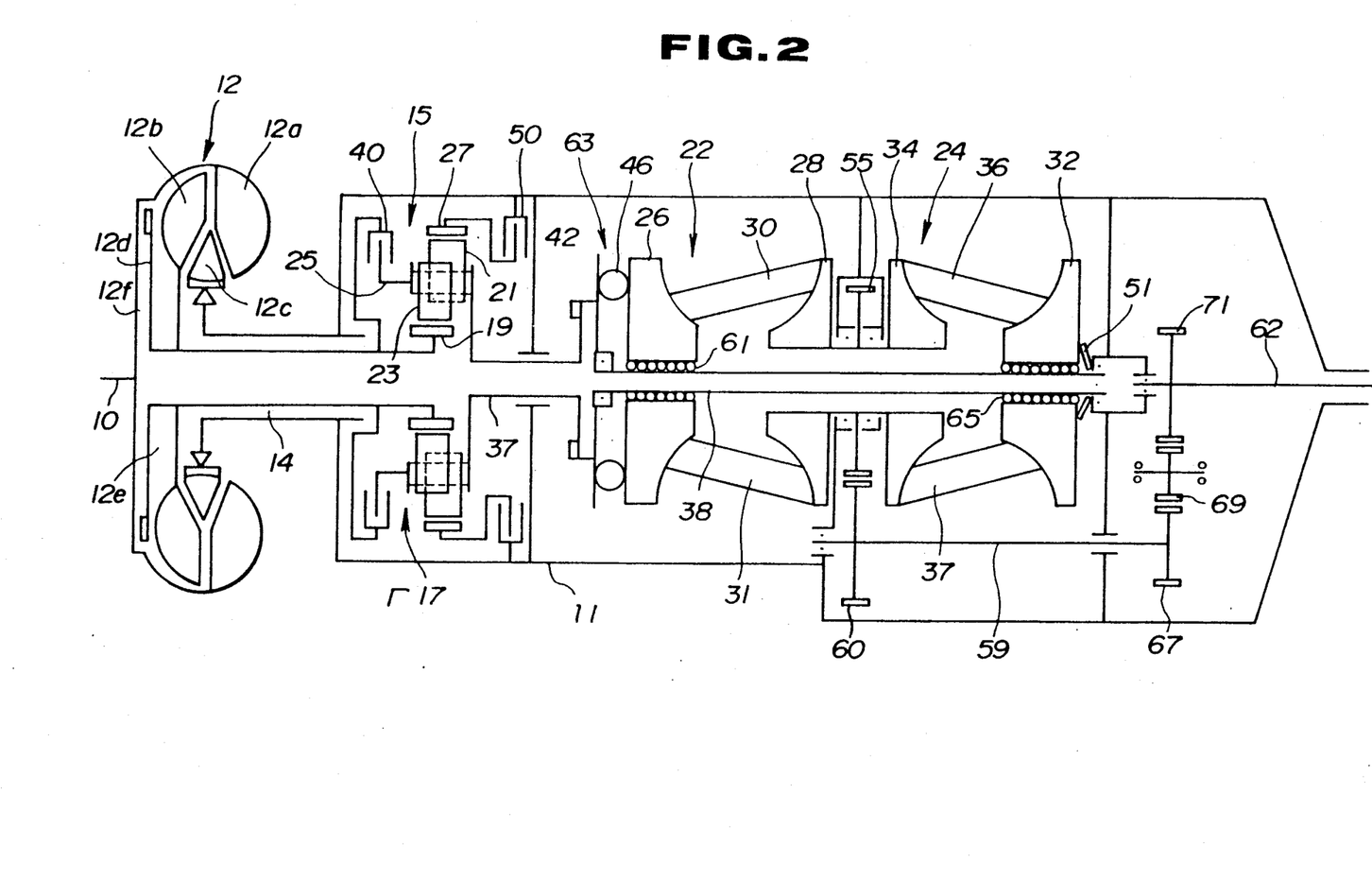
FIG. 2 is a schematic view of the transmission.

Referring to FIG. 2, the traction drive transmission includes a hydrodynamic torque transmitting unit in the form of a torque converter 12 with a lock-up mechanism in the form of a lock-up clutch 12d, a forward reverse change-over mechanism 15, and a half-toroidal dual-cavity traction drive system 22, 24.

The torque converter 12 includes a pump impeller 12a, a turbine runner 12b, a stator 12c and the above-mentioned lock-up clutch 12d. In a lock-up state, the lock-up clutch 12d mechanically connects the pump impeller 12a to the turbine runner 12b, while in a lock-up release state, the lock-up clutch 12d is disengaged to interrupt the mechanical connection. The lock-up clutch 12d is engaged or disengaged in response to a difference between pressures in an apply side chamber 12e and a release side chamber 12f. The pump impeller 12a is rotatable with an engine output shaft 10, while the turbine runner 12b is rotatable with a turbine shaft 14 connected to the forward reverse change-over mechanism 15.

The forward reverse change-over mechanism 15 includes a dual-pinion planetary gear set 17, a forward clutch 40, and a reverse brake 50. The planetary gear set 17 comprises a sun gear 19, a plurality of pairs of intermeshed dual pinions 21, 23 rotatably supported on a pinion carrier 25, and a ring gear 27. The sun gear 19 is rotatable with the turbine shaft 14. The pinion carrier 25 is connectable via the forward clutch 40 to the turbine shaft 14. The ring gear 27 is adapted to be held stationary to a casing 11 by the reverse brake 50. The pinion carrier 25 is rotatable with an input shaft 37 of the half-toroidal dual-cavity traction drive system 22, 24.

The half-toroidal dual-cavity traction drive system includes a first change-speed mechanism 22 and a second change-speed mechanism 24. The first change-speed mechanism 22 has a set of coaxial input and output discs 26, 28 having facing toric surfaces and a pair of friction rollers 30, 31 disposed between and in driving contact with the toric surfaces for transmitting torque between the input and output discs 26, 28. Similarly, the second change-speed mechanism 24 has a set of coaxial input and output discs 32, 34 having facing toric surfaces and a pair of friction rollers 36, 37 disposed between and in driving contact with the toric surfaces for transmitting torque between the input and output discs 32, 34. The input disc 26 is supported on an intermediate shaft 38 by way of a ball spline 61. The intermediate shaft 38 is rotatable with the input shaft 37. A cam flange 42 is arranged on the back side of the input disc 24. Between facing cam surfaces of the cam flange 42 and the back of the input disc 26 are arranged cam rollers 46. The cam flange 42, input disc 26 and cam rollers 46 form a loading cam 63. The input disc 32 of the second change-speed mechanism 23 is supported on the intermediate shaft 37 by way of a ball spline 65. A disc spring 51 is arranged to bias the input disc 32 toward the output disc 34. The output discs 28 and 34 are rotatably supported on the intermediate shaft 38.

A drive from the output discs 28 and 34 is transmitted to a drive gear 55 which meshes with a follower gear 60 of a counter shaft 59. This shaft 59 has a gear 67 meshing an idler gear 69 which in turn meshes a gear 71 of an output shaft 62.

Figure 1:
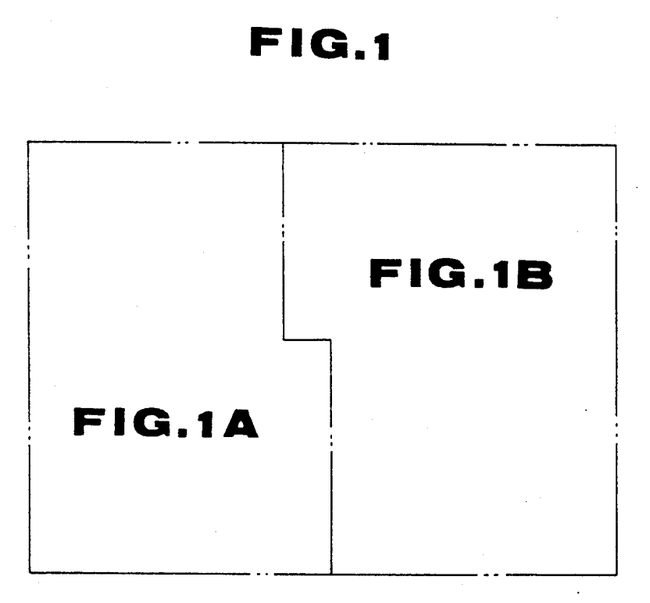
FIG. 1 is a view combining FIG. 1A with FIG. 1B.
Figure 1A:
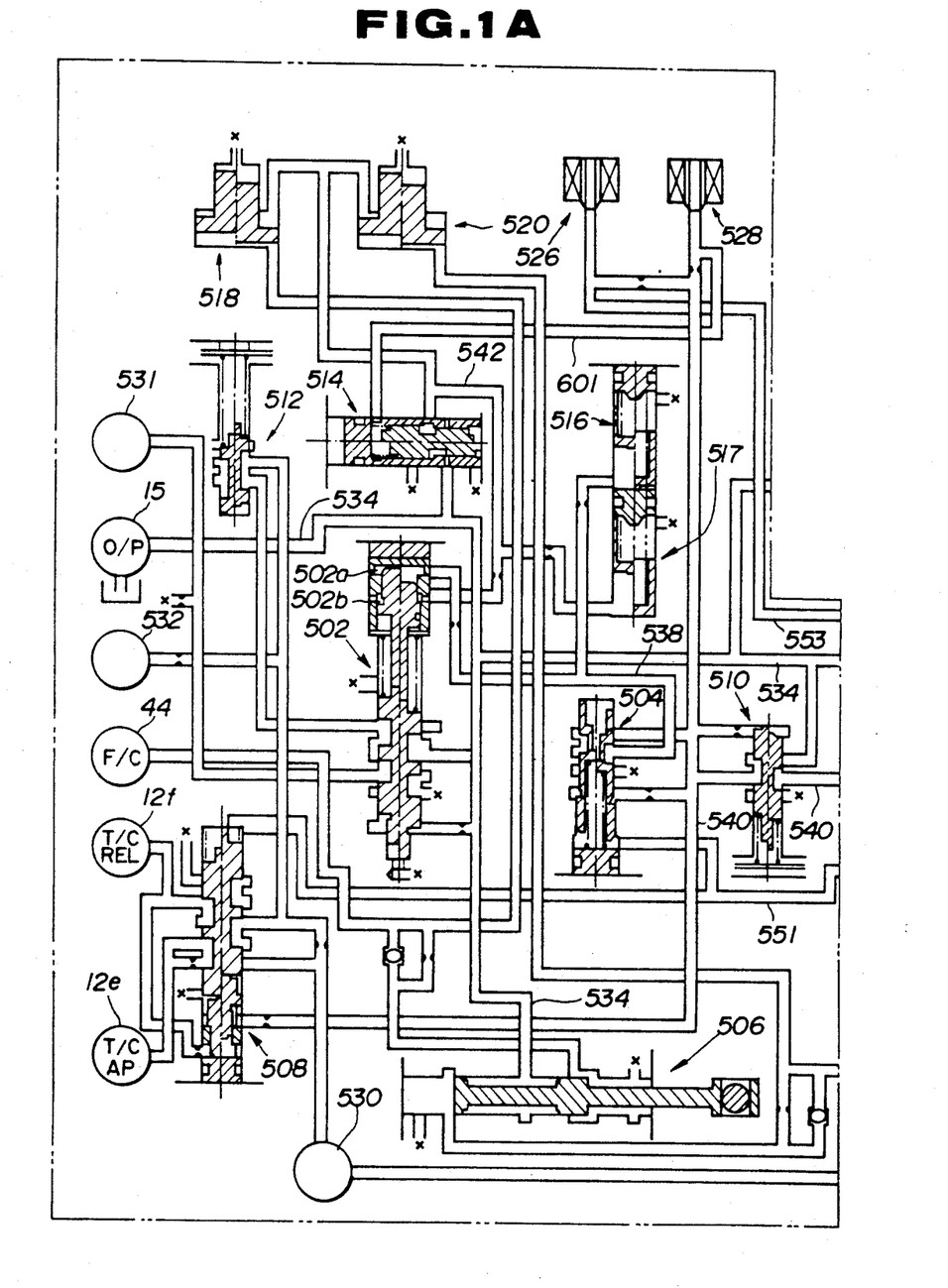
FIGS. 1A and 1B, when combined, illustrate a hydraulic control system for a traction drive transmission employing a forward reverse change-over mechanism followed by a half-toroidal dual-cavity traction drive system.
Figure 1B:
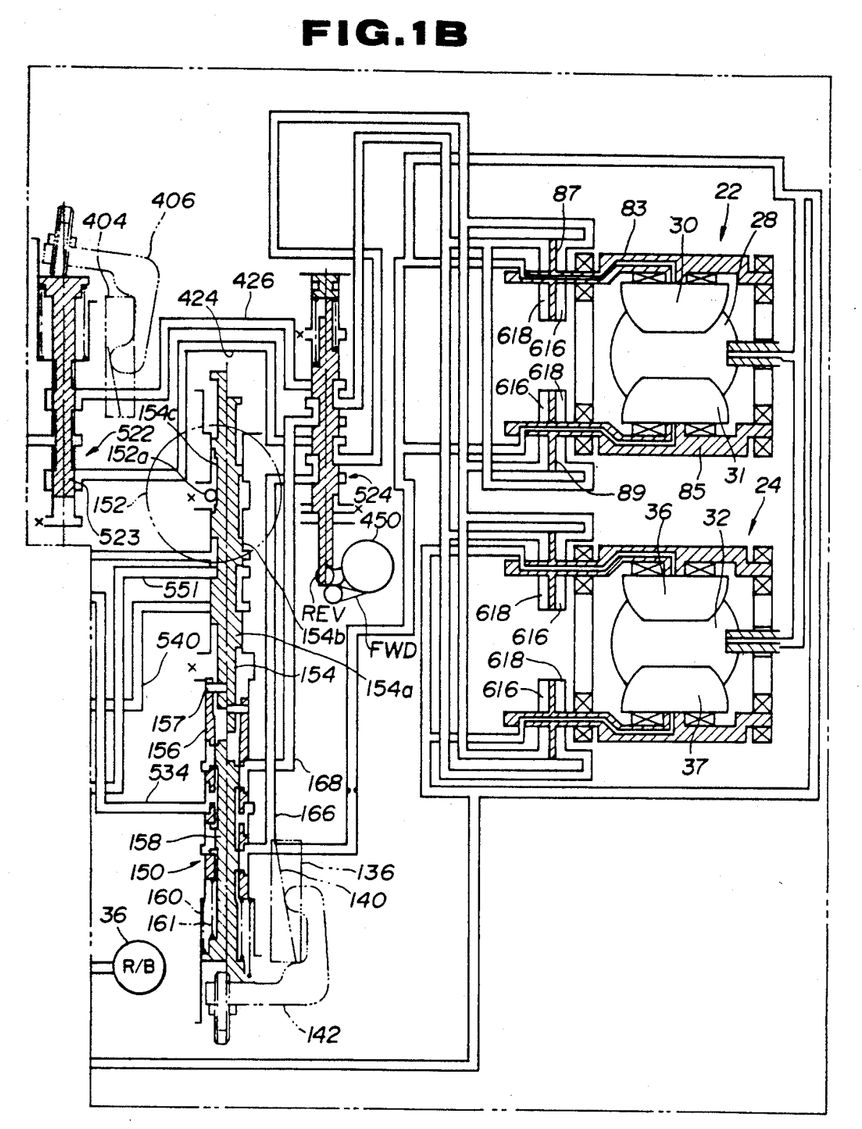

Referring to FIGS. 1A and 1B, the hydraulic control system is explained below.

This hydraulic control system comprises the following parts:

A forward shift control valve 150;
A rotary actuator (a stepper motor) 152;
A line pressure regulator valve 502;
A manual valve 506;
A lock-up control valve 508;
A pilot pressure valve 510;
A pressure modifier valve 504;
A relief valve 512;
An accumulator control valve 514;
An accumulator 516;
An accumulator 517;
A forward clutch accumulator 518;
A reverse brake accumulator 520;
A reverse ratio valve 522;
A forward reverse change-over valve 524;
A lock-up solenoid 526; and
A line pressure solenoid 528.

In FIG. 1B, servo motors for the first and second change-speed mechanisms 22, 24 are schematically illustrated. Roller carriers 83 and 85 for the friction rollers 30 and 31 of the first change-speed mechanism 22 are rotatable and axially movable. The roller carriers 83 and 85 are connected to pistons 87 and 89, respectively. On both sides of each of the pistons 87 and 89 are formed a high side or upshift side servo chamber 616 and a low side or downshift side servo chamber 618. The structure of the servo motors for the second change-speed mechanism 24 is substantially the same as the first change-speed mechanism 22.

The line pressure regulator valve 502 effects pressure regulation to adjust a pressure within a line pressure conduit 534 leading from an oil pump 15 at an adjusted pressure, i.e., a line pressure. The pressure modifier valve 504 adjusts the hydraulic pressure within a conduit 538 in response to an operating state of the lock-up solenoid 526. The hydraulic pressure adjusted by the pressure modifier valve 504 is supplied via the conduit 538 to the line pressure regulator valve 502. The manual valve 506 selectively supplies the line pressure from the conduit 534 to the forward clutch 44 or the reverse brake 36. The lock-up control valve 508 controls the state of the lock-up clutch 12d in response to a signal pressure supplied thereto through a signal pressure conduit 551. This signal pressure conduit 551 is selectively connected to a solenoid pressure conduit 553 extending from the lock-up solenoid 526 or a pilot pressure conduit 540 extending from the pilot pressure valve 510. The pilot pressure valve 510 generates a constant hydraulic pressure as the pilot pressure.

Figure 3:
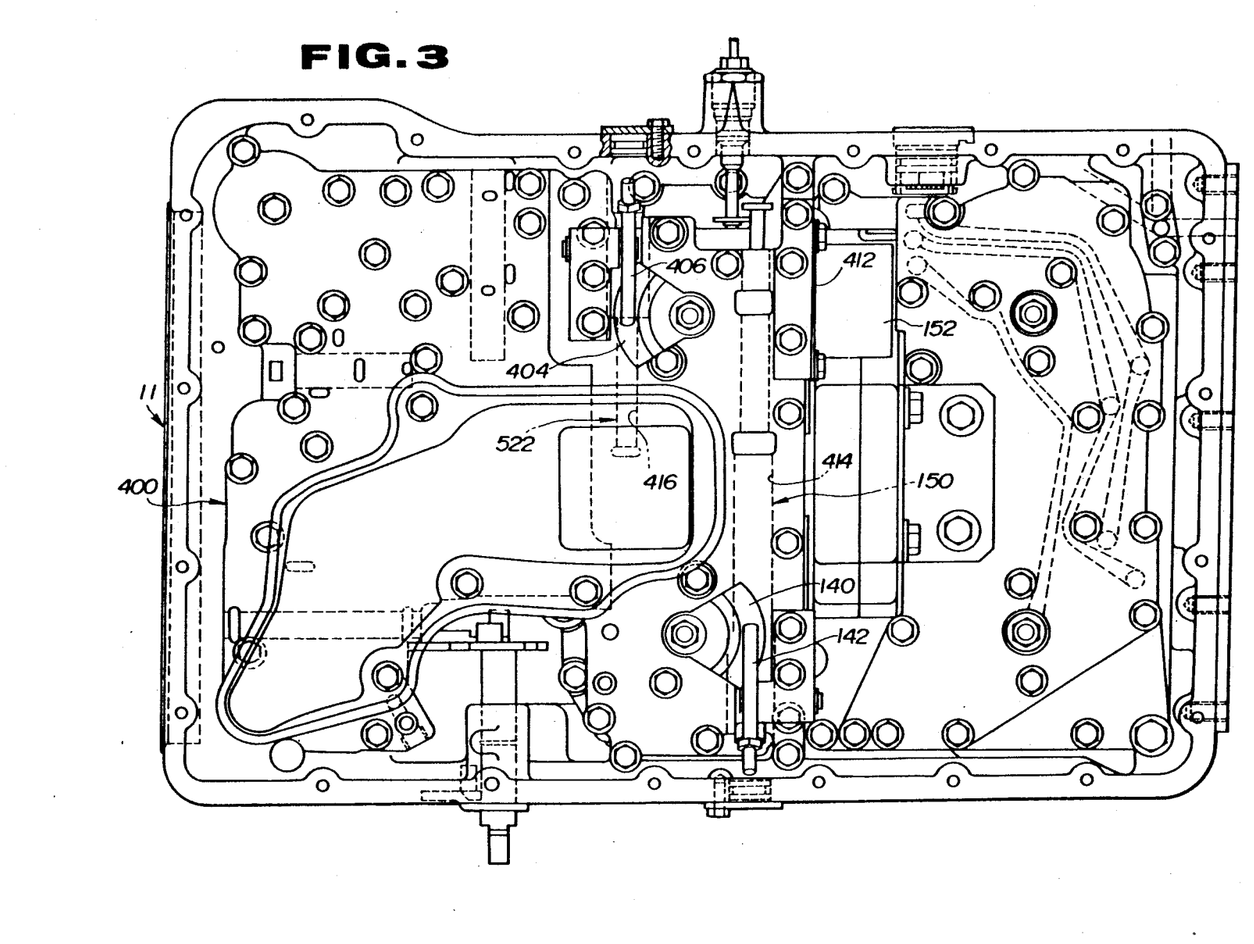
FIG. 3 is a bottom plan view of transmission casing with an oil pan removed to show a control valve assembly.
Figures 4, 5:
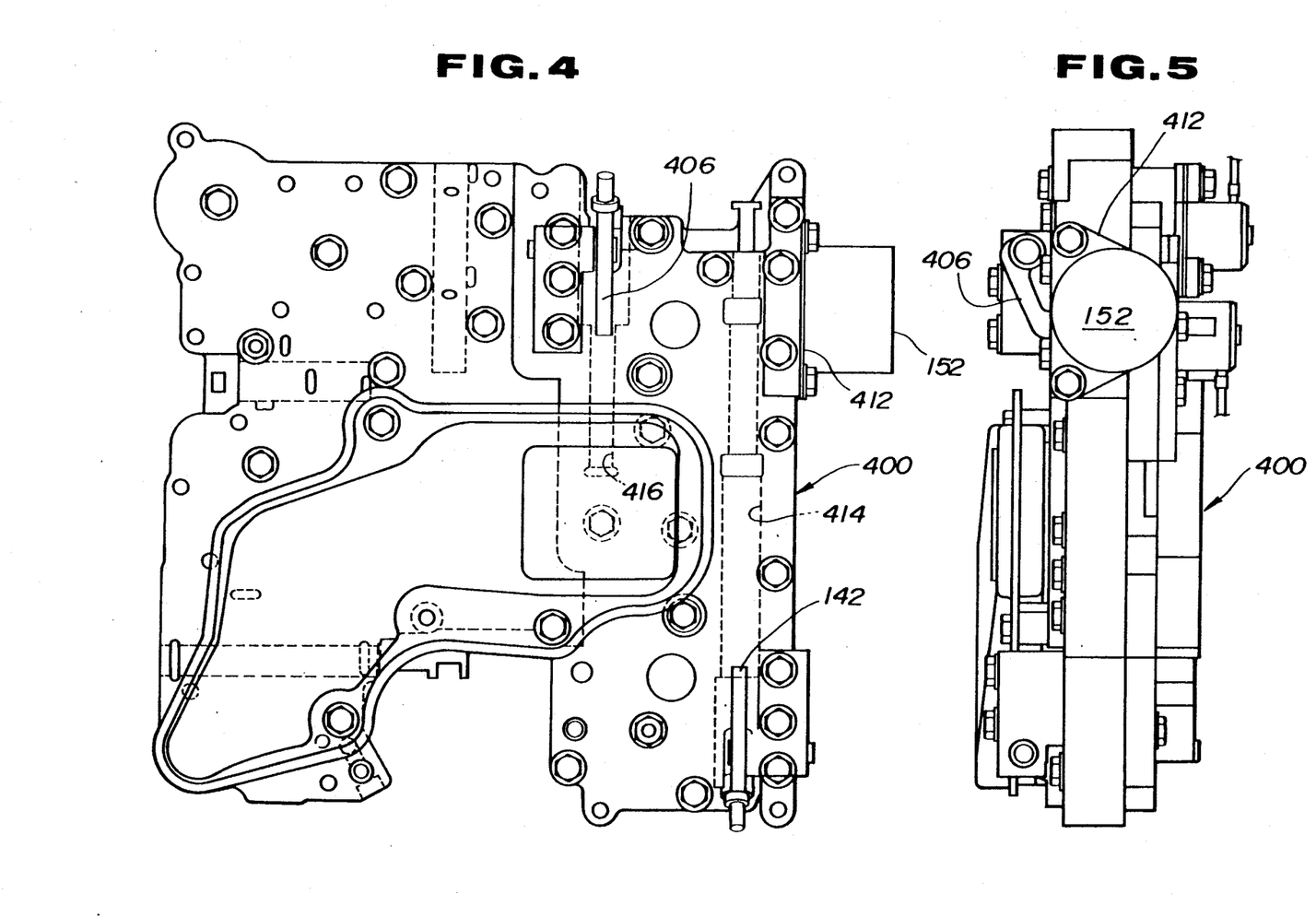
FIG. 4 is an exploded plan view of the control valve assembly to show the periphery of a valve body.
FIG. 5 is a side view of the control valve assembly viewing FIG. 4 from the righthand side.

Referring to FIGS. 3, 4 and 5, the arrangement of the forward shift control valve 150, stepper motor 152, and reverse ratio valve 522 is explained below.

FIG. 3 is a bottom plan view of the casing 11 with an oil pan removed. Within the casing 11 is mounted a control valve assembly for the hydraulic control system illustrated in FIGS. 1A and 1B. The control valve assembly comprises a valve body 400. As best seen in FIGS. 4 and 5, the valve body 400 has on its periphery a mount site 412 which the stepper motor 152 is secured to. The valve body 400 is formed with a valve bore 414 slidably receiving the valve elements of the forward shift control valve 150, namely the valve spool 158, valve sleeve 156, and the rod 154 formed with the rack 154c. The rack 154c meshes with the pinion 152a of the stepper motor 152. This valve bore 414 is disposed adjacent the mount site 412. The valve body 400 is also formed with a valve bore 416 slidably receiving a valve element, namely a valve spool 523, of the reverse ratio valve 522. Since it is not necessary to arrange a stepper motor for actuating the reverse ratio valve 522, the valve bore 416 is disposed inwardly of the valve body 400 remote from the mount site 412.

Referring to FIGS. 1A, 1B and 4, mounted on the valve body 400 are the lever 142 which cooperates with the spool 158 of the forward shift control valve 150 and the lever 406 which cooperates with the spool 523 of the reverse ratio valve 522. These levers 142 and 406 are arranged with respect to their associated precess cams 140 and 404 as shown in FIG. 3. For reduced manufacturing cost, the precess cams 140 and 404 are of the identical design and size and the levers 140 and 406 are of the identical design and size, too.

The relationship between the reverse ratio valve 522, forward shift control valve 150, forward reverse change-over valve 524, and forward precess cam 136, and reverse precess cam 404 is substantially the same as the relationship of the counterparts described in the before-mentioned copending U.S. patent application Ser. No. 07/448,194 which corresponds to European Patent Application No. 89 123 150.8. This relationship is briefly explained below.

The forward reverse change-over valve 524 has a spring biased spool having one end abutting an arm of a collar 450. The spool of the forward reverse change-over valve 524 has a forward or spring set position as illustrated by the left half thereof viewing in FIG. 1B and is movable to a reverse position as illustrated by the right half thereof viewing in FIG. 1B. In the forward position of the forward reverse change-over valve 524 as illustrated by the left half thereof viewing in FIG. 1B, two fluid conduits 424 and 426 extending from the reverse ratio valve 522 are blocked, while two fluid conduits 166 and 168 extending from the forward shift control valve 150 are allowed to communicate with servo chambers 616 and 618, respectively. In the reverse position of the forward reverse change-over valve 524, the fluid conduits 166 and 168 extending from the forward shift control valve 150 are blocked, while the fluid conduits 424 and 426 coming from the reverse ratio valve 522 are allowed to communicate with the servo chambers 616 and 618, respectively.

Let us now assume that the forward clutch 40 of the forward reverse change-over mechanism 15 is engaged. In this forward running state, the counter shaft 59 turns in the forward direction, and thus no torque is transmitted to the collar 450 since a one-way clutch is unlocked. Thus, owing to the action of the spring biasing the spool of the forward reverse change-over valve 524, the collar 450 assumes a position indicated at FWD and the spool of the forward reverse change-over valve 524 assumes the forward position as illustrated by the left half thereof viewing in FIG. 1B. If the reverse brake 50 is applied with the forward clutch 40 disengaged, the counter shaft 59 turns in the opposite reverse direction.

In this reverse running state, the above-mentioned one-way clutch is locked to transmit torque to the collar 450. This causes the collar 450 to assume a position as indicated at REV against the action of the spring biasing the spool of the forward reverse change-over valve 524. Thus, the spool of the forward reverse change-over valve 524 assumes the reverse position as illustrated by the right half thereof viewing in FIG. 1B.

The relationship between the collar 450, one-way clutch and counter shaft 59 is the same as the relationship illustrated in FIG. 3 of the copending U.S. patent application Ser. No. 07/448,194 which corresponds to European Patent Application NO. 89 123 150.8. For full understanding of this relationship, reference is made to these documents.

Referring to FIG. 1B, the spool 158 and the rod 154 of the forward shift control valve 150 are slidably disposed within the same valve bore 414 (see FIG. 3) in axially spaced relationship. The rod 154 is formed with the rack 154c meshing a pinion 152a of the stepper motor 152. The rod 154 has one end portion disposed in the sleeve 156 and joined thereto by a radial pin 157.

Arranged around the spring 161 is a spring 160 which biases the spool 158 toward the lever 142. Owing to this spring 160, the spool 158 can follow movement of one end portion of the level 142. The opposite end the lever 142 rests on a cam face 140 of the forward precess cam 136. The precess cam 136 is connected to one of the roller carriers for unitary rotation therewith. Owing to this precess cam 136 and the lever 142 which serves as a cam follower, a rotational motion of the roller carrier due to inclination of the roller supported by the roller carrier is converted into an axial displacement of the spool 158. In a stable state when the maximum reduction ratio is established, the rod 154, sleeve 156 and spool 158 assume positions as illustrated by the right halves thereof, respectively, viewing in FIG. 1B. In another stable state when the minimum reduction ratio is established, the rod 154, sleeve 156 and spool 158 assume positions as illustrated by the left halves thereof, respectively, viewing in FIG. 1B. As will be seen from FIG. 1B, the spool 158 assumes a predetermined relationship with the sleeve 156 in each of the above-mentioned two stable states. If the sleeve 156 is moved from the position corresponding to the maximum reduction ratio to any position owing to movement of the rod 154 by the stepper motor 152, the spool 158 remains in the original position determined by the position of the lever 142, allowing supply of hydraulic fluid to the upshift servo chambers 616 via the fluid conduit 166 and discharge of hydraulic fluid from downshift servo chambers 618 via the fluid conduit 168. This fluid communication is established when the forward reverse change-over valve 524 assumes the forward position as illustrated by the right half thereof viewing in FIG. 1B. Owing to the pressure differential created, each of the rollers incline, causing the pressess cam 136 to rotate in such a direction as to swing the lever 142 clockwise, viewing in FIG. 1B. This clockwise movement of the lever 142 causes the spool 158 to move toward the predetermined relation with the sleeve 156.

The rod 154 is provided with two axially spaced lands 154a and 154b which define therebetween grooves serving as a transfer passage. This transfer passage between the lands 154a and 154b selectively connects the signal pressure conduit 551 leading to the lock-up control valve 508 to the pilot pressure conduit 540 coming from the pilot pressure valve 510 or the solenoid pressure conduit 553 coming from the lock-up solenoid 526 depending upon the position of the rod 154. When the rod 154 is in the position as illustrated by the right half thereof viewing in FIG. 1B, the spool 158 and sleeve 156 of the shift control valve cooperate with each other to provide the maximum reduction ratio, the transfer passage between the lands 154a and 154b establishes fluid communication between the pilot pressure conduit 540 and the signal pressure conduit 551, but blocks fluid communication between the signal pressure conduit 551 and the solenoid pressure conduit. Under this condition, the constant pilot pressure from the pilot pressure valve 510 is supplied to the lock-up control valve 508, holding the lock-up control valve to a lock-up release position corresponding to a lock-up release state of the lock-up mechanism 12d the torque converter 12. This condition is kept established during movement of the rod 154 from the maximum reduction ratio corresponding position to a predetermined position corresponding to a reduction ratio near the maximum reduction ratio. During movement of the rod 154 beyond this predetermined position to the minimum reduction ratio corresponding position as illustrated by the left half thereof viewing in FIG. 1B, the transfer passage between the lands 154a and 154b blocks the fluid communication between the signal pressure conduit 551 and the pilot pressure conduit 540 and establishes the fluid communication between the signal pressure conduit 551 and the solenoid pressure conduit 553. Thus, during this movement of the rod 154, the lock-up control valve 508 is supplied with the solenoid pressure from the lock-up solenoid 526 under the control of a control unit, not shown. However, during movement of the rod 154 between the predetermined position and the maximum reduction ratio corresponding position, the pilot pressure is supplied to the lock-up control valve 508 to hold the lock-up mechanism 12d to the lock-up release state.

In FIG. 1B, the reverse ratio valve 522 includes a spring biased spool 523 abutting one end of the lever 406 whose opposite end resting on a cam face of the reverse process cam 404. With this reverse ratio valve 522, a single reverse ratio is established.

What is claimed is:

1. A control valve assembly for a traction drive transmission having a forward reverse change-over mechanism followed by a traction drive system, comprising:
   a valve body having on its periphery a mount site, said valve body being formed with a first valve bore adjacent said mount site, and a second valve bore;
   a forward shift control valve including a valve element slidably disposed in said first valve bore;
   an actuator secured to said mount site and drivingly connected to said forward shift control valve;
   a reverse ratio valve including a valve element slidably disposed in said second valve bore;
   a first lever mounted on said valve body to cooperate with said valve element of said forward shift control valve; and
   a second lever mounted on said valve body to cooperate with said valve element of said reverse ratio valve.

2. A control valve assembly as claimed in claim 1, wherein said actuator is a stepper motor.

3. A control valve assembly as claimed in claim 2, wherein said forward shift control valve includes a rod formed with a rack, and wherein said stepper motor has a pinion meshing said rack.

4. A traction drive transmission comprising:
    a forward reverse change-over mechanism;
    a traction drive system drivingly connected to said forward reverse change-over mechanism;
    a valve body formed with a first valve bore and a second valve bore;
    a forward shift control valve operatively connected to said traction drive system, said forward shift control valve including a first valve element slidably disposed in said first valve bore;
    an actuator mounted on said mount site and drivingly connected to said first valve element; and
    a reverse ratio valve operatively connected to said traction drive system, said reverse ratio valve including a second valve element slidably disposed in said second valve bore, said second valve element being out of drive connection with said actuator.

5. A continuously variable transmission comprising:
    a forward reverse change-over mechanism;
    a continuously variable drive system drivingly connected to said forward reverse change-over mechanism;
    a valve body formed with a first valve bore and a second valve bore;
    a forward shift control valve operatively connected to said continuously variable drive system, said forward shift control valve including a first valve element slidably disposed in said first valve bore;
    an actuator mounted on said mount site and drivingly connected to said first valve element; and
    a reverse ratio valve operatively connected to said continuously variable drive system, said reverse ratio valve including a second valve element slidably disposed in said second valve bore, said second valve element being out of drive connection with said actuator.

* * * * *